June 30, 1964     N. C. SIMONSEN     3,139,233

SEAL CONSTRUCTION FOR ROTARY MECHANISMS

Filed April 30, 1962     2 Sheets-Sheet 1

INVENTOR.
NELSON C. SIMONSEN

BY Thomas W. Kennedy

ATTORNEY

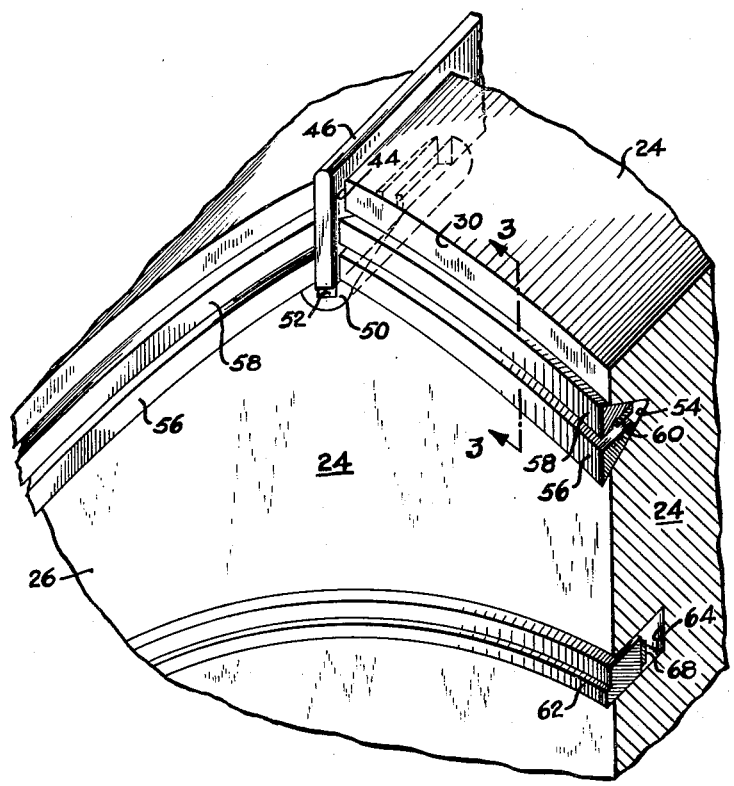

United States Patent Office 3,139,233
Patented June 30, 1964

3,139,233
SEAL CONSTRUCTION FOR ROTARY
MECHANISMS
Nelson C. Simonsen, Clifton, N.J., assignor to Curtiss-Wright Corporation, a corporation of Delaware
Filed Apr. 30, 1962, Ser. No. 191,089
5 Claims. (Cl. 230—145)

The present invention relates broadly to the art of rotary mechanisms, and is particularly directed to sealing means for such mechanisms.

The invention is particularly useful in connection with rotary mechanisms similar to that disclosed in United States Patent Number 2,988,065, although as will become apparent this invention is not limited to this specific type of rotary mechanism. Rotary mechanisms of this type are especially useful as fluid motors, fluid pumps and internal combustion engines. In the following description the invention is described in relation to an internal combustion engine but the invention is also suitable for fluid pumps and fluid motors.

A rotary engine as disclosed in said patent comprises an outer body having a cavity therein and an inner body or rotor disposed therein rotatable relative to the outer body, about an axis laterally spaced from but parallel to the axis of said cavity. The inner body is journaled on an eccentric portion of a shaft which is co-axial with the outer body and which in turn is journaled in bearings carried by the outer body end walls. The outer body has axially-spaced end walls and a peripheral wall interconnecting the end walls to form said cavity, the inner surface of the cavity peripheral wall having a multi-lobed profile which preferably is basically an epitrochoid. The inner body has end faces disposed adjacent to said outer body end walls for sealing cooperation therewith and has a peripheral surface with a plurality of circumferentially-spaced apex portions, each carrying a radially-movable seal for sealing engagement with the multi-lobed inner surface of the outer body peripheral wall to form a plurality of working chambers between the two bodies which vary in volume upon relative rotation of the two bodies.

In prior rotary combustion engines of the aforementioned type, one form of end face seal means, as illustrated in co-pending application Serial Number 5,497, filed January 29, 1960, now Patent No. 3,033,180, comprises a plurality of seal strips received within grooves in the end faces of the inner body, there being one such end face seal strip extending between each pair of adjacent apex portions at each inner body end face. Each such end face seal strip is urged axially against the outer-body end wall by spring means disposed at the bottom of the groove.

For efficient operation, the engine working chambers should be sealed effectively by the apex seal means and the end faces seal means. The inner body or rotor carries the end face seal means for the combustion gases, preferably at each end face and preferably adjacent to the periphery of the rotor end face, said end face or peripheral seal means providing a substantially continuous contact area in sealing engagement with the adjacent end wall of the outer-body adjacent to the rotor periphery.

Seals must also withstand severe combustion pressures and temperatures. During engine operation, each working chamber has an operating cycle including intake, compression, expansion and exhaust. The end face seal means functions to seal the combustion gases within the chambers and therefore is subjected to extreme variations in gas pressure and temperature.

An object of the present invention comprises the provision of novel and simple end face seals for a rotor of a rotary engine in which said seal means has improved sealing and heat conduction effectiveness.

A still further object of the invention comprises the provision of a rotor end face seal construction in which a pair of seal strips are received in a single rotor end face groove and a single spring urges both seal strips against the side walls of the groove and against the adjacent outer body end wall.

In accordance with the invention each pair of end face seal strips are received within an outwardly diverging V-shaped groove formed in a rotor end face and a single spring urges the two seal strips apart against the diverging groove side walls.

According to the invention, the aforementioned end face seal means are combined with the rotor apex seal means to provide a novel and effective sealing system for the working chambers of a rotary engine.

Other objects of the invention will become apparent upon reading the annexed detailed description in connection with the drawing in which:

FIGURE 2 is an enlarged perspective view of a portion of the rotor and illustrating the novel end face seal arrangement of the invention;

Figure 1:
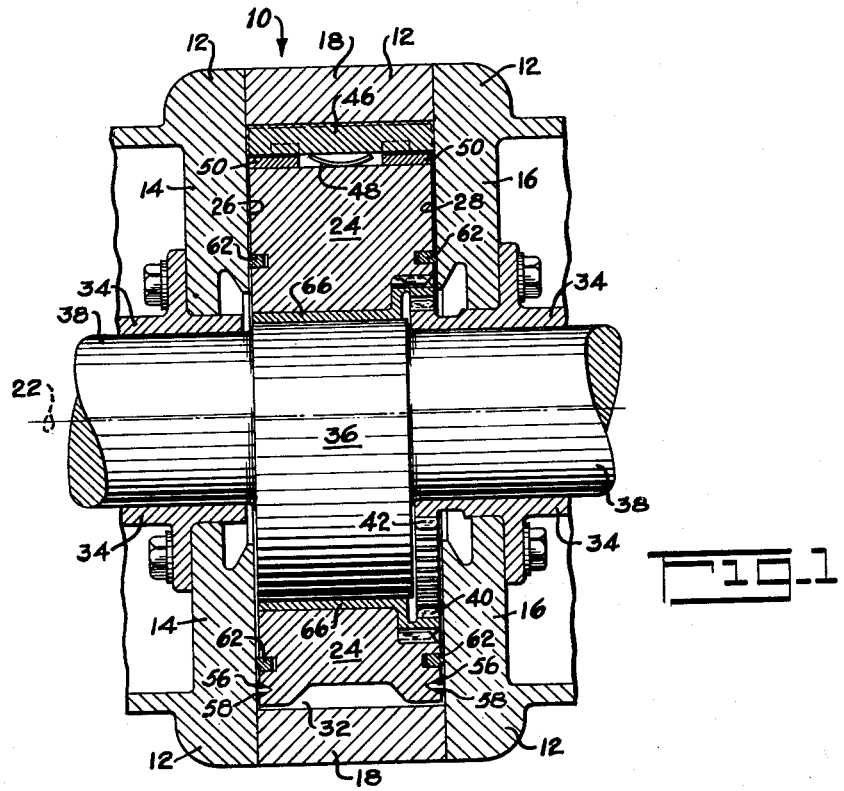
FIGURE 1 is a longitudinal cross-sectional view of a rotary engine embodying the invention.
Figure 3:
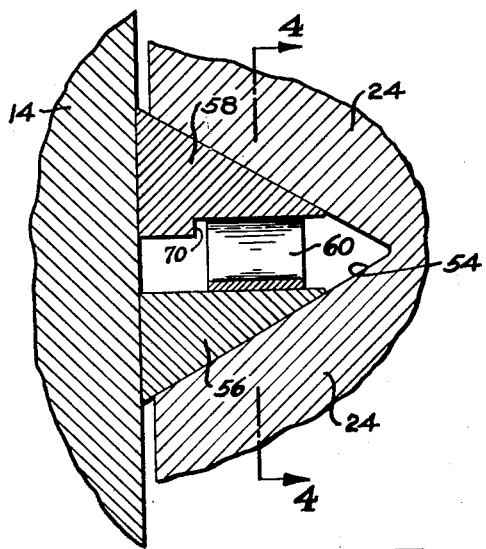
FIGURE 3 is an enlarged cross-sectional view through the end-face seat strips and showing their cooperation with the rotor and outer-body end wall, as taken along line 3—3 of FIGURE 2.
Figure 4:
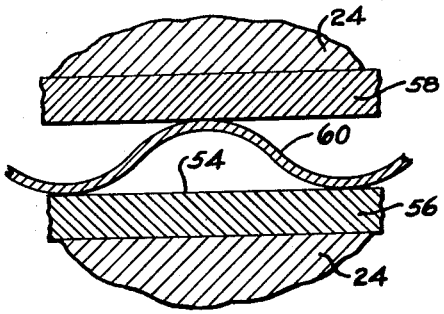
FIGURE 4 is an enlarged, partial, longitudinal, sectional view along line 4—4 of FIGURE 3.

Referring to the drawings, a rotary internal combustion engine 10 comprises an outer body 12 having axially-spaced end walls 14 and 16 with a peripheral wall 18 connected therebetween to form a cavity 20. When viewed in a plane transverse to the axis 22 of the cavity 20, the inner surface of the peripheral wall 18 of said cavity 20 has a multi-lobed profile which preferably is an epitrochoid, and preferably having two lobes.

An inner body or rotor 24 is disposed within the cavity 20 of the outer body 12. The inner rotor has axially-spaced end faces 26 and 28 disposed adjacent to the outer body end walls 14 and 16. In addition, the rotor has a plurality of circumferentially-spaced apex portions 30 which as explained in said aforementioned patent preferably are one more in number than the number of lobes of the cavity 20. The apex portions 30 are in sealing engagement with the inner surface of peripheral wall 18 to form a plurality of working chambers 32 between the inner rotor 24 and outer body 12. The geometrical axis of the rotor 24 is offset from and disposed parallel to the axis 22 of the outer body.

In the engine 10 illustrated, the outer body 12 is stationary while the rotor 24 is journaled by a bearing 66 on an eccentric portion 36 of a shaft 38, said shaft being co-axial with the geometrical axis 22 of the cavity 20 in said outer body and being journaled in bearings 34 carried by the end walls 14 and 16. Upon rotation of the rotor 24 relative to the outer body 12 the working chambers 32 vary in volume.

In order to maintain the relative motion of the inner rotor 24 relative to the stationary outer body 12 an internal gear 40 is, as illustrated, secured to the inner rotor 24 co-axially with the rotor axis and is disposed in mesh with a fixed gear 42 disposed on the bearing 34 which is secured to the outer-body end wall 16, said fixed gear 42 being co-axial with the shaft 38.

The working chambers 32 are sealed for efficient engine operation. For this purpose each rotor apex portion 30 has an outwardly-facing apex groove 44 running from one end face 26 to the other end face 28 in a direction parallel to the rotor axis. Seal strip means 46 are received within each of said apex grooves 44 and a spring 48 under each seal means 46 urges it radially outwardly so that each said seal strip means projects beyond its groove 44 into sealing engagement with the inner surface of the peripheral wall 18.

The bottom of each apex groove 44 has an enlarged cylindrical portion at each end of the groove 44 and an intermediate seal member 50 is slidably fitted within each such cylindrical portion. Each intermediate seal member 50 has a slot 52 for receiving the radially inner edge of the adjacent end of a seal strip means 46 for sealing cooperation therewith.

Each end face 26 and 28 of the inner rotor 24 has a plurality of grooves 54 therein adjacent to the rotor periphery and running from one apex portion 30 of the rotor to the adjacent apex portion 30 and a seal means is received in each said groove 54.

To prevent passage into the working chambers of the lubricating oil, serving the rotor eccentric 36 and the gears 40 and 42, an oil seal ring 62 is received in a groove 64, which is located on each rotor end face 26 or 28, and is urged axially outward by spring means 68 into sealing cooperation with the adjacent outer-body end wall 14 or 16.

The engine so far described in substantially similar to the engine disclosed in the aforementioned United States Patent Number 2,988,065 and for further description reference is made to said patent. The seal arrangement so far described is substantially similar to the seal arrangement disclosed in the aforementioned co-pending patent application Serial Number 5,497, filed January 29, 1960, and reference is made to said application.

According to the invention, the rotor 24 carries the end-face seal means, which comprise a pair of seal strips 56 and 58 received in side-by-side relation in each said groove 54. Between each pair of seal strips 56 and 58 and disposed within each said groove 54, there is a single spring means 60 which preferably is a wave-type spring and which urges the associated pair of seal strips 56 and 58 laterally apart against the side walls of their groove 54.

Each groove 54 has an outwardly diverging V-shaped cross-section whereby the spring force against each seal strip 56 and 58 has a component which acts to urge said seal strip outwardly of the groove along the groove wall contacted by the seal strip. In this way, the single spring 60 between a pair of seal strips 56 and 58 not only urges the two seal strips 56 and 58 apart against the adjacent side walls of their groove, but also is effective to urge these seal strips outwardly from the groove into engagement with the adjacent end wall 14 or 16 of the outer body.

With this construction a single spring 60 is effective to hold each seal strip of a pair of seal strips 56 and 58 in good sealing contact with both the adjacent side wall of its rotor groove 54 and with the adjacent end wall of the outer body thereby providing an effective seal against leakage between the rotor 24 and said end wall 14 or 16. Because of the good contact of each pair of seal strips 56 and 58, with the side walls of their associated groove 54 and with the adjacent outer body end wall 14 or 16, caused by their spring 60, any heat of the hot engine exhaust gases reaching said seal strips is quickly conducted away from said strips, thereby avoiding excessive temperatures of said seal strips with accompanying seal distortion. This good contact of the seal strips 56 and 58 with the rotor 24 and end walls 14 and 16 also serves to provide a heat conduction path from the rotor to said end walls.

Because each seal strip 56 and 58 is held against the adjacent side wall of its groove 54, the friction between said groove side wall and seal strip will prevent longitudinal movement of said strip along its groove. Hence, with the present invention, no special means are required to prevent longitudinal movement of each seal strip in its groove.

In addition, the friction between said groove side walls and said strips 56 and 58 serves to dampen any vibration of the seal strips.

Each groove 54 has an outwardly diverging V-shaped cross-section, which is easier to machine than the prior art form of groove because the V-shaped cut in the metal is relatively wide relative to its depth at the metal surface.

The dimensions of the cross-section of the V-shaped groove 54 of the invention need not be held to such close tolerances as the prior art form of groove since the spring means 60 of the invention between the pair of strips 56 and 58 is expansible to suit the position of the strips 56 and 58 when installed in the groove.

The angle of divergence between the groove side walls should be sufficiently large so that the spring means 60 is effective to overcome the friction of the strips 56 and 58 against the groove side walls and to urge the associated seals outwardly against the end walls 14 and 16. On the other hand, the angle of divergence should be sufficiently small so that the end wall reactions on the seals 56 and 58 can overcome the friction with the groove side walls, compress the spring 60 and urge the strips 56 and 58 inwardly without clamping between the end walls 14 and 16, and the groove side walls, for example, as a result of any unevenness of the end walls because of manufacturing tolerances, thermal distortions etc.

The angle of divergence between the groove side walls should be chosen to suit the desired pressure of the seals against the surface of the housing end walls, giving consideration to the materials used.

In accordance with the invention, a single spring 60 in each seal means exerts a continuous pressure for sealing cooperation on four separate sealing faces, of which two faces provide a dual sealing action against the end wall 14 or 16.

The aforementioned spring means 60 is preferably a wave-type spring running between each pair of seal strips 56, 58 and is retained behind a shoulder 70 disposed on one of said associated pair of strips 56 and 58.

The end face seals are sufficiently flexible so that the spring means, bearing against the sides of the seal strips, flattens the strips 56 and 58 against their adjacent groove walls thereby removing any waviness or crests present in the strips. The strip flexibility also helps the strips to follow any unevenness in the flat surfaces of the housing end walls 14 and 16.

While the preferred embodiment comprises a pair of seal strips 56 and 58 per groove 54, it is also possible to have a single, preferably tapered or triangular seal strip per groove 54. For example, each seal strip 56 of a pair of strips 56 and 58 could be eliminated in such a manner that the spring 60 acts at one end against a side wall of the groove, which now preferably is parallel to its engine axis, and at its other end against the single seal strip 58 for urging the strip against its adjacent inclined side wall of the groove.

The invention has been described herein as applicable to an end face seal means, but it is obvious that it has other applications, for example, it can be also applied to an apex seal means.

The improvements of the invention provide good sealing and heat conduction and ease of manufacture; and increase the operating life of the engine.

While I have described my invention in detail in its present preferred embodiment it will be obvious to those skilled in the art after understanding my invention that various changes and modifications may be made therein without departing from the spirit or scope thereof.

What is claimed is:

1. A rotor for use in a rotary mechanism having a cavity with spaced end walls and within which said rotor is received for sealing cooperation with said end walls; said rotor having a pair of end faces and a peripheral face with a plurality of circumferentially-spaced apex portions; and end-wall-engaging seal means carried by an end face of said rotor adjacent to the rotor periphery, said rotor end face seal means including a plurality of pairs of seal strips, there being one pair of said seal strips extending between each pair of adjacent apex portions of the rotor with each pair of said seal strips being received in side-by-side relation within a common groove in said rotor end face, each said groove having side walls which are oppositely inclined to its rotor end face and diverge from each other in an outward direction and spring means within each said groove for urging the associated pair of seal strips apart in opposite directions generally parallel to its rotor end face for sealing engagement of each seal strip with the adjacent side wall of said groove and also for urging said pair of seal strips in a direction outwardly of said groove along the groove side wall engaged by the strip.

2. A rotor as recited in claim 1 in which the spring means acting on each pair of seal strips comprises a wave-type spring running between said strips and being retained behind a shoulder disposed on one of said associated pair of strips.

3. A rotor as recited in claim 1 and in which each strip is generally triangular with one side in sealing engagement with its adjacent groove side, with another side in cooperation with the spring means, and with a third side having an end-wall-engaging seal face for sealing the rotor end face.

4. A rotor as recited in claim 1 and having a plurality of radially-movable apex seal means carried by and extending along said rotor apex portions, there being one such apex seal means for and received in a groove in each rotor apex portion; and said rotor having a plurality of intermediate seal members each carried by said rotor in and at an end of a rotor apex groove for sealing engagement with the adjacent end of the apex seal means received within said apex groove and with the ends of the two pairs of adjacent end face seal strips, each said intermediate seal member being movable in a direction parallel to the rotor axis with each intermediate seal member having an end-wall-engaging seal face.

5. A rotor as recited in claim 1 and in which the side walls of each said groove form an angle of divergence therebetween which is sufficiently large so that said spring means is effective to urge the associated seals outwardly against said end wall and which is sufficiently small so that said end wall is effective to urge the associated seals inwardly into said groove to accommodate irregularities in said end wall.

References Cited in the file of this patent
UNITED STATES PATENTS

| | | |
|---|---|---|
| 723,656 | Dunn | Mar. 24, 1903 |
| 1,698,876 | Clanin | Jan. 15, 1929 |
| 2,051,346 | Rugland | Aug. 18, 1936 |

FOREIGN PATENTS

| | | |
|---|---|---|
| 138,062 | Great Britain | Feb. 17, 1921 |